United States Patent Office 3,734,881
Patented May 22, 1973

3,734,881
ONE COMPONENT NON-TOXIC SELF-EXTINGUISHING SILICONE ELASTOMER
Ross A. Shingledecker, Elizabethtown, Ky., assignor to Dow Corning Corporation, Midland, Mich.
No Drawing. Filed July 15, 1971, Ser. No. 163,113
Int. Cl. C08g 51/04
U.S. Cl. 260—37 SB    18 Claims

ABSTRACT OF THE DISCLOSURE

A silicone elastomer composition free of sulfur, compounds of tin, mercury, bismuth, copper and sulfur of a polydiorganosiloxane, a silica or titanium dioxide filler, an acetoxysilane or ketoxime silane, carbon black and a platinum compound are used as self-extinguishing elastomers which are non-toxic and cure at room temperature.

---

This invention relates to a silicone elastomer which is self-extinguishing with respect to fire.

Safety with respect to fire is a goal for both the consumer and the manufacturers of products of all kinds and descriptions. Many materials are inherently combustible and inherently support combustion and thus require alteration to make them resistant to burning. Silicones generally support combustion although some may be slower burning than others, for example those with high phenyl content. To overcome this combustible nature of materials a broad spectrum of flame inhibitors have been developed. Most of these flame inhibitors are highly halogenated compounds and are suitable for many organic plastics and the like. These flame inhibitors are, for the most, not suitable for silicone materials and in addition these halogenated compounds give off highly toxic vapors when burning. Since most materials, even with flame inhibitors, burn when exposed to a fire source whether or not they support combustion, these materials which give off toxic vapors become important to safety problems, since toxic vapors could be more dangerous to human life than the fire itself. For this reason, the search for a non-toxic self-extinguishing silicone elastomer has been continuing for many years. However, the formulation of a silicone elastomer composition which vulcanizes at room temperature and one which can be stored and shipped in one container in the unvulcanized state, to make it self-extinguishing is more complex than merely adding conventional flame inhibitors. Many of the flame inhibitors will not function in silicone elastomers and those which do, are unsuitable because some give off toxic vapors when burned, some deteriorate the elastomeric properties to a point such that they are no longer useful, some cause the composition to gel during storage and some prevent the composition from curing.

It is known by U.S. Pat. No. 3,514,424, Noble et al. that platinum compounds in peroxide cured polydiorganosiloxane gum based silicone elastomers provide flame retardant elastomers. However, the addition of platinum compounds to room temperature vulcanizable silicone elastomer compositions does not provide a self-extinguishing silicone elastomer.

It is totally unexpected that the combination of certain ingredients would provide a self-extinguishing room temperature vulcanizable silicone elastomer which is non-toxic.

It is therefore an object of this invention to provide a room temperature vulcanizable silicone elastomer which is self-extinguishing and also non-toxic and is a one component composition. This and other objects will become more apparent from the following detailed description of the present invention.

This invention relates to a room temperature vulcanizable silicone elastomer composition which is stable in the absence of moisture but cures upon exposure to moisture consisting essentially of a composition prepared by mixing under essentially anhydrous conditions (A) 100 parts by weight of a hydroxyl endblocked polydimethylsiloxane having a viscosity of from 1000 to 300,000 cs. at 25° C. (B) from 5 to 150 parts by weight of a filler selected from the group consisting of silica and titanium dioxide (C) from 5 to 20 parts by weight of a silane of the formula $RSiY_3$ where R is a vinyl radical and Y is a radical selected from the group consisting of an acetoxy radical and a ketoxime radical of the formula $$-O-N=CR'R''$$

where each R' and R'' is a radical selected from the group consisting of methyl and ethyl, (D) from 0.5 to 4 parts by weight carbon black having a surface area of at least 10 square meters per gram and a particle size of from 0.005 to 0.20 micron, and (E) from 1 to 150 parts by weight platinum per million parts by weight of composition, the platinum being in the form of a platinum compound, said composition being free of sulfur, compounds of tin, mercury, bismuth, copper and sulfur whereby the composition when cured by exposure to moisture provides a silicone elastomer which has a self-extinguishing time of less than 20 seconds after 12 seconds exposure in a 1550° C. flame on a sample having a thickness of less than 0.100 inch.

The room temperature vulcanizable silicone elastomer composition of this invention is a one component composition which is a composition wherein all the ingredients necessary to give the final cured elastomer can be packaged and stored in one container in the uncured state and when removed from the container cure to an elastomer.

The room temperature vulcanizable silicone elastomer composition of this invention is stable in the absence of moisture put cures when exposed to moisture such as atmospheric moisture. As long as the storage container seals out moisture the composition remains in the uncured state and then cures when exposed to atmospheric moisture.

The composition is based on 100 parts by weight of a polydiorganosiloxane having a viscosity of from 1000 to 300,000 cs. at 25° C., preferably from 2000 to 50,000 cs. at 25° C. The organic radicals of the polydiorganosiloxane can be methyl, vinyl or phenyl where the phenyl is present in an amount of 0 to 10 mol percent based on the total number of organic radicals in the polydiorganosiloxane, preferably all the organic radicals are methyl radicals. The polydiorganosiloxanes are endblocked with siloxy units of the formula $X_nR_{3-n}SiO_{0.5}$ where R is methyl, ethyl, vinyl or phenyl, n is 2 or 3 and X is hydroxyl, acetoxy or ketoxime radical of the formula $-O-N=CR'R''$ where each R' or R'' is methyl or ethyl. 
These polydiorganosiloxanes are well known in the art and can be purchased commercially. Those polydiorganosiloxanes with acetoxy or ketoxime endblocking can readily be prepared by reacting the corresponding acetoxy or ketoxime silane with hydroxyl-endblocked polydiorganosiloxanes.

The filler can be a silica filler or a titanium dioxide filler. The silica fillers can be either a reinforcing silica filler or a non-reinforcing silica filler. The reinforcing silica fillers include fume silica filler, precipitated silica fillers, silica aerogel and silica xerogel. The non-reinforcing silica fillers include finely divided quartz fillers such as crushed or ground quartz, diatomaceous earth and the like. The filler can be present in amounts of from 5 to 150 parts by weight based on 100 parts by weight of the polydiorganosiloxane, preferably the filler is present in amounts of from 25 to 100 parts by weight per 100 parts by weight of the polydiorganosiloxane. The filler can be one type of filler or a mixture of fillers. The fillers are available commercially.

The silane has a formula RSiY₃ where R is defined above and Y is an acetoxy radical or a ketoxime radical of the formula —O—N=CR'R" where R' and R" are defined above. The silanes can be illustrated by vinyltriacetoxysilane, methyltriacetoxysilane, ethyltriacetoxysilane, phenyltriacetoxysilane, $$CH_2=CHSi[O-N=C(CH_3)_2]_3,$$

$$CH_2=CHSi[O-N=C(CH_3)(CH_2CH_3)]_3,$$

$$CH_2=CHSi[O-N=C(CH_2CH_3)_2]_3,$$

$$CH_3Si[O-N=C(CH_3)_2]_3,$$

$$CH_3Si[O-N=C(CH_3)(CH_2CH_3)]_3,$$

$$CH_3Si[O-N=C(CH_2CH_3)_2]_3,$$

$$CH_3CH_2Si[O-N=C(CH_3)_2]_3,$$

$$CH_3CH_2Si[O-N=C(CH_3)(CH_2CH_3)]_3,$$

$$C_6H_5Si[O-N=C(CH_3)_2]_3 \text{ and}$$

$$C_6H_5Si[O-N=C(CH_3)(CH_2CH_3)]_3.$$

The acetoxy and ketoxime silanes are well known in the art, for example, the ketoxime silanes are described in U.S. Pat. No. 3,189,576, by Sweet which is hereby incorporated by reference. Where the enblocking of the polydiorganosiloxane contains either acetoxy or ketoxime, the silane used corresponds to the endblocking functionality. For example, where the endblocking of the polydiorganosiloxane contains acetoxy, the silane is also an acetoxy silane and where the endblocking of the polydiorganosiloxane contains ketooxime, the silane is also a ketoxime silane. The silane is present in the composition in an amount of 5 to 20 parts by weight based on 100 parts by weight based on 100 parts by weight of the polydiorganosiloxane, preferably the silane is present in an amount of from 7 to 15 parts by weight based on 100 parts by weight of the polydiorganosiloxane. For the purposes of this invention the preferred silane is any silane with a vinyl on it. These vinyl silanes provide the best self-extinguishing compositions.

The compositions of this invention contain carbon black in amounts of from 0.5 to 4 parts by weight based on 100 parts by weight of the polydiorganosiloxane, preferably from 0.5 to 2 parts by weight carbon black based on 100 parts by weight polydiorganosiloxane. The carbon blacks can have a surface area of at least 10 square meters per gram and a particle size of 0.05 to 0.20 micron. The carbon black can be illustrated by acetylene carbon black, lamp black, fine thermal carbon black, furnace carbon black or channel carbon black. Carbon black present in amounts greater than 4 parts by weight is deleterious to the self-extinguishing properties of the silicone elastomer of the present invention. Amounts of carbon black less than 0.5 part by weight are insufficient to provide self-extinguishing properties.

The compositions of this invention contain platinum in any unsupported from that will permit substantially in any unsupported form that will permit essentially homogeneous dispersion. A supported form of platinum is platinum metal precipitated on a substrate such as silica, carbon or alumina. Therefore, platinum in an unsupported form is any platinum containing material which is not platinum metal precipitated on a substrate. Included in the platinum containing materials are the readily dispersible platinum compounds and complexes which are well known in the art. Illustrative of the readily dispersible platinum containing materials include, chloroplatinic acid, platinum chlorides, Pt[P(CH₂CH₂CH₃)₃]₂, platinum bromides, a complex of platinous halide and an olefin such as ethylene, propylene, butylene, cyclohexane and styrene, $$Pt(CH_3CN)_2Cl_2, [Pt(CH_3CN)_2(NH_3)_4]Cl_2,$$

$$Pt(NH_3)_2Cl_2, K[PtCl_3(CH_2CH_2CH_2OH)],$$

$$PtBr_2(C_2H_4)_2, K[PtBr_3(C_2H_4)],$$

$$PtCl_2(C_2H_4), (CH_3)_2C=CH_2 \cdot PtCl_2,$$

$$H_2Pt(CN)_4 \cdot 5H_2O, H[PtCl_3(CH_3(CH_3CN)],$$

$$[Pt(CH_3)_4] \cdot [PtCl_4], PtCl_2[P(CH_2CH_3)_3]_2,$$

$$PtCl_2 \cdot PCl_3, PtCl_2 \cdot P(OH)_3,$$

$$PtCl_2 \cdot P(OCH_2CH_3)_3, PtCl_2 \cdot [P(OCH_2CH_3)_3]_2,$$

$$Pt(CN_3, (CH_3)_4Pt, (CH_3)_3Pt-Pt(CH_3)_3,$$

$$(CH_3)_3Pt(CH_3COCH=\overset{-O}{\underset{|}{C}}CH_3), PtCl_2CO \text{ and } PtBr_2CO.$$

The platinum material is added to the composition of this invention to provide from 1 to 150 parts by weight invention to provide from 1 to 150 parts by weight platinum per million parts by weight of composition.

The compositions of this invention must be free of compounds of tin, mercury, bismuth, copper and sulfur and elemental sulfur. The presence of these materials destroys the self-extinguishing properties of the silicone elastomer. For this reason, the conventional tin catalyst such as dibutyltin dilaurate, dibutyltin diacetate and stannous octoate must not be used in the present compositions.

The compositions of the present invention cure at room temperature without the use of catalysts. However, if one wishes to use a catalyst for vulcanization, the catalyst desired for use should be thoroughly observed as to its effects on the self-extinguishing properites.

The composition of this invention can also contain metal oxides such as zinc oxide, iron oxide and alumina in amounts of from 0.1 to 10 parts by weight based on 100 parts by weight of the polydiorganosiloxane.

The compositions of the present invention are prepared by mixing the ingredients under essentially anhydrous conditions. The order of mixing is not narrowly critical. Conventional methods for forming homogeneous mixtures such as combining the polydiorganosiloxane with the filler and then adding the other ingredients to this mixture. The platinum compounds can conveniently be added by mixing with a diluent such as organosiloxane fluids to assist in dispersion and measuring since the amounts used are very small and measurements could be difficult. After the ingredients are mixed, the composition is stored under anhydrous conditions until cure is desired, then exposing this composition to moisture, such as atmospheric moisture, will cause the composition to vulcanize to a silicone elastomer which is self-extinguishing with respect to fire.

It was completely unexpected that the particular combination of ingredients would provide a self-extinguishing silicone elastomer which would vulcanize at room temperature and which would be non-toxic when burned. Platinum without carbon black does not provide silicone elastomer which is self-extinguishing in very thin thicknesses and carbon black without platinum does not provide a self-extinguishing silicone elastomer. The combination of platinum and carbon black in a composition such as defined above with a tin catalyst also does not provide a self-extinguishing silicone elastomer. Furthermore, other useful moisture curable room temperature vulcanizable silicone elastomers are not made self-extinguishing by the combination of carbon black and platinum.

These self-extinguishing room temperature vulcanizable silicone elastomers are useful as insulation for electrical equipment, for encapsulating, as sealants and other areas where room temperature vulcanizable silicone elastomers are usable. These silicone elastomers have the added advantages that they resist burning and are self-extinguishing once ignited and when burning do not give off highly toxic vapors or large volumes of smoke.

The following examples are for illustrative purposes only and should not be construed as limiting the present invention which is properly delineated in the claims.

EXAMPLE 1

The following compositions were prepared by mixing the ingredients of each composition under anhydrous conditions:

(A)

100 parts by weight of a hydroxyl endblocked polydimethylsiloxane having a viscosity of 12,500 cs. at 25° C.,
99 parts by weight of a 5 micron quartz filler,
10 parts by weight of $$CH_2=CHSi[O-N=C(CH_3)(CH_2CH_3)]_3$$

0.5 part by weight of zinc oxide, and
0.5 part by weight of lampblack having a particle size of 0.043 micron and a surface area of 45 to 48 m.²/g.

(B)

Same as (A) above plus 3.8 parts by weight platinum per million parts by weight composition added as a solution of chloroplatinic acid in a vinyl containing polydimethylsiloxane fluid.

(C)

100 parts by weight of the polydimethylsiloxane defined in (A) above,
94 parts by weight of a 5 micron quartz filler,
5 parts by weight of a fume silica filler,
3 parts by weight of a hydroxyl endblocked polymethylphenylsiloxane fluid,
10 parts by weight $$CH_2=CHSi[O-CHSi[O-N=C(CH_3)(CH_2CH_3)]_3$$

1 part by weight of the lampblack defined in (A) above,
0.5 part by weight zinc oxide, and
6.0 parts by weight platinum per million parts by weight composition, the platinum added as defined in B above.

(D)

Same as (C) above except 10 parts by weight of vinyltriacetoxysilane are substituted for 10 parts by weight of $$CH_2=CHSi[O-N=C(CH_3)(CH_2CH_3)]_3$$

98 parts by weight of the quartz filler is used in place of the 94 parts and 5.9 parts by weight platinum per million parts by weight of the composition is used in place of the 6.0 p.p.m. of (C) above.

(E)

Same as (D) above except 7 parts by weight of fume silica filler is used in place of the 5 parts by weight of (D) above and 5.8 parts by weight platinum per million parts by weight composition is used in place of the 5.9 p.p.m. of (D) above.

The compositions were allowed to cure for 7 days at room temperature prior to the determination of the durometer, Shore A scale by ASTM-D 676-59T, tensile strength at break, pounds per square inch, and elongation at break in percent by ASTM-D-412 and tear strength, Die B, in pounds per inch by ASTM-D-624-54. The self-extinguishing properties were determined by placing the cured sample of silicone elastomer in a vertical position 0.75 inch above the center of a flame which is at 1550° C. wherein the flame was 1.5 inches high. The sample was left in the flame for a specified number of seconds and then removed from the flame. The time after removal from the flame until the flame and glow of the sample goes out was termed the self-extinguishing time and was recorded in seconds. Each self-extinguishing time was an average of four test pieces. The results were as shown in Table I.

TABLE I

| Composition: | Durometer, Shore A | Tensile strength, p.s.i. | Elongation, percent | Tear strength, p.p.i. | Exposure time in flame, sec. | Self-extinguishing time, sec. |
|---|---|---|---|---|---|---|
| A | | | | | | (¹) |
| A | 43 | 550 | 195 | 32 | 15 | <8 |
| B | 44 | 490 | 200 | 18 | 15 | 4-5 |
| C | 50 | 625 | 183 | 23 | 12 | 5 |
| D | 49 | 500 | 145 | | 12 | 2 |
| E | 56 | 515 | 142 | 36 | 15 | |

¹ Keeps burning.

EXAMPLE 2

The following compositions were prepared by mixing the ingredients of each composition under essentially anhydrous conditions:

(A)

100 parts of weight of the polydimethylsiloxane as defined in Example 1(A),
98 parts by weight of a 5 micron quartz filler,
7 parts by weight of a fume silica filler,
3 parts by weight of a hydroxyl endblocked polymethylphenylsiloxane fluid,
10 parts by weight $$CH_2=CHSi[O-N=C(CH_3)(CH_2CH_3)]_3,$$

1 part by weight of the lampblack defined in Example 1(A),
0.5 part by weight zinc oxide and
5.8 p.p.m. platinum as defined in Example 1.

(B)

Same as (A) above except 65.6 parts by weight quartz filler were used in place of 98 parts by weight and 6.8 p.p.m. platinum was used in place of 5.8 p.p.m. platinum.

(C)

Same as (A) above, except 37 parts by weight quartz filler was used in place of 98 parts of quartz filler and 8.1 p.p.m. platinum was used in place of 5.8 p.p.m. platinum.

(D)

Same as (C) above, except 37 parts by weight of a naturally mined silica having a particle size of 3.8 micron.

(E)

100 parts by weight polydimethylsiloxane as defined in Example 1(A),
10 parts by weight of fume silica filler,
2.9 parts by weight of hydroxyl endblocked polymethylphenylsiloxane fluid,
1.0 parts by weight of the lampblack defined in Example 1(A),
10 parts by weight of $$CH_2=CHSi[O-N=C(CH_3)(CH_2CH_3)]_3,$$

0.5 part by weight of zinc oxide, and
11 parts by weight of platinum per million parts by weight of composition where platinum was added as described in Example 1(B).

The compositions were cured and the properties determined as described in Example 1. The results were as shown in Table II.

TABLE II

| | Durometer, Shore A | Tensile strength, p.s.i. | Elongation, percent | Tear strength, p.p.i. | Exposure time in flame, sec. | Self-extinguishing time, sec. |
|---|---|---|---|---|---|---|
| Composition: | | | | | | |
| A | 53 | 630 | 150 | 34 | 12 | 10 |
| B | 47 | 490 | 160 | 35 | 12 | 8 |
| C | 46 | 560 | 300 | 36 | 15 / 30 | <1 / <1 |
| D | 41 | 430 | 310 | 28 | 15 / 30 | <1 / <1 |
| E | 41 | 310 | 300 | 28 | 15 / 30 | <1 / 19 |

EXAMPLE 3

The following compositions were prepared by mixing the ingredients of each composition under essentially anhydrous conditions:

(A)

100 parts by weight of the polydimethylsiloxane as described in Example 1(A),
37 parts by weighto f 5 micron quartz filler,
7 parts by weight of fume silica filler,
3 parts by weight of a hydroxyl endblocked polymethylphenylsiloxane fluid,
1 part by weight of the lampblack as described in Example 1(A),
10 parts by weight of $$CH_2=CHSi[O-N=C(CH_3)(CH_2CH_3)]_3,$$

and
8.1 parts by weight platinum per million parts by weight composition, added as defined in Example 1(B).

(B)

Same as (A) above, except 0.5 part by weight zinc oxide is present.

(C)

Same as (A) above, except 1.0 part by weight zinc oxide is present.

(D)

Same as (A) above, except 6.3 parts by weight zinc oxide is present and 7.8 p.p.m. platinum was used in place of the 8.1 p.p.m. platinum of (A) above (E)

Same as (A) above, except 05 part by weight fume titanium dioxide also is present.

The compositions were cured and the properties determined as described in Example 1. The results were as shown in Table III.

TABLE III

| | Durometer, Shore A | Tensile strength, p.s.i. | Elongation, percent | Tear strength, p.p.i. | Exposure time in flame, sec. | Self-extinguishing time, sec. |
|---|---|---|---|---|---|---|
| Composition: | | | | | | |
| A | 46 | 465 | 195 | 42 | 12 | 2 |
| B | 44 | 530 | 250 | 55 | 12 | <2 |
| C | 46 | 565 | 240 | 47 | 12 | <1 |
| D | 45 | 515 | 230 | 50 | 12 | <2 |
| E | 45 | 497 | 240 | 34 | 15 | <2 |

EXAMPLE 4

The following compositions were prepared by mixing the ingredients of each composition under essentially anhydrous conditions:

(A)

100 parts by weight of the polydimethylsiloxane as described in Example 1(A),
37 parts by weight of 5 micron quartz filler,
7 parts by weight of a fume silica filler,
3 parts by weight of a hydroxyl endblocked polymethylphenylsiloxane fluid,
0.5 part by weight of zinc oxide,
10 parts by weight $$CH_2=CHSi[O-N=C(CH_3)(CH_2CH_3)]_3$$

and
8.1 parts by weight platinum per million parts by weight of composition, added as described in Example 1(B).

(B)

Same as (A) above, except 1.0 part by weight of lampblack as defined in Exambple 1(A) was present.

(C)

Same as (A) above, except 5.0 parts by weight of lampblack as defined in Example 1(A), present and 7.8 p.p.m. platinum was used in place of 8.1 p.p.m. platinum as in (A) above.

(D)

Same as (A) above, except 10.0 parts by weight lampblack as defined in Example 1(A), present and 7.6 p.p.m. platinum was used in place of 8.1 p.p.m. platinum as in (A) above.

(E)

Same as (B) above, except 1.0 part of a fine thermal carbon black having a particle size of 0.0256 micron and a surface area of 13 square meters per gram was used in place of the lampblack.

The compositions were cured and the properties determined as described in Example 1. The results were as shown in Table IV.

TABLE IV

| | Durometer, Shore A | Tensile strength, p.s.i. | Elongation, percent | Tear strength, p.p.i. | Exposure time in flame, sec. | Self-extinguishing time, sec. |
|---|---|---|---|---|---|---|
| Composition: | | | | | | |
| A | 45 | 435 | 200 | 14 | 12 | 34 |
| B | 46 | 470 | 203 | 14 | 12 | 3 |
| C | 44 | 507 | 203 | 16 | 12 | 30 |
| D | 52 | 520 | 180 | 20 | 12 | Burned |
| E | 43 | 370 | 210 | 43 | 12 | 2 |

EXAMPLE 5

The following compositions were prepared by mixing the ingredients of each composition under essentially anhydrous conditions:

(A)

100 parts by weight of the polydimethylsiloxane as described in Example 1 (A),
37 parts by weight of 5 micron quartz filler,
7 parts by weight of fume silica filler,
3 parts by weight of a hydroxyl endblocked polymethylphenylsiloxane fluid,
1 part by weight of the lampblack as described in Example 1(A),
10 parts by weight of

$$CH_2=CHSi[O-N=C(CH_3)(CH_2CH_3)]_3$$

0.5 part by weight of zinc oxide,
0.0 part by weight platinum per million parts by weight composition, added as described in Example 1(B).

(B)

Same as (A) above, except 2 p.p.m. platinum.

(C)

Same as (A) above, except 4 p.p.m. platinum.

(D)

Same as (A) above, except 8 p.p.m. platinum.

(E)

Same as (A) above, except 20 p.p.m. platinum.

(F)

Same as (A) above, except 40 p.p.m. platinum.

(G)

Same as (A) above, except polydimethylsiloxane had a viscosity of 2,000 cs. at 25° C.

(H)

Same as (D) above, except polydimethylsiloxane had a viscosity of 2,000 cs. at 25° C.

(I)

Same as (E) above, except polydimethylsiloxane had a viscosity of 2,000 cs. at 25° C.

The compositions were cured as described in Example 1 and the flame resistant properties of the silicone elastomer were determined as described in Example 1. The silicone elastomer of (E) above had a limiting oxygen index of 36 to 40 as compared to a silicone elastomer without the carbon black and platinum of less than 20.9. The results were as shown in Table V.

TABLE V

| Composition: | Thickness of sample, inches | Exposure time in flame, sec. | Self-extinguishing time, sec. |
|---|---|---|---|
| A | 0.085 | 12 | (¹) |
|   | 0.078 | 12 | (¹) |
|   | 0.072 | 12 | (¹) |
| B | 0.057 | 12 | 9 |
|   | 0.065 | 12 | 5.5 |
|   | 0.050 | 12 | 6.5 |
|   | 0.051 | 12 | 12 |
| C | 0.078 | 12 | 4 |
|   | 0.076 | 12 | 4.5 |
|   | 0.080 | 12 | 3.5 |
|   | 0.080 | 12 | 3 |
| D | 0.055 | 12 | 1 |
|   | 0.055 | 12 | 5 |
|   | 0.052 | 12 | 2.5 |
|   | 0.052 | 12 | 1 |
|   | 0.055 | 12 | 2 |

TABLE V—Continued

| | Thickness of sample, inches | Exposure time in flame, sec. | Self-extinguishing time, sec. |
|---|---|---|---|
| E | 0.110 | 15 | 1 |
|   | 0.108 | 15 | 1 |
|   | 0.111 | 15 | 1 |
|   | 0.110 | 30 | 14 |
|   | 0.108 | 30 | 5 |
|   | 0.111 | 30 | 11 |
|   | 0.102 | 30 | 12 |
| F | 0.095 | 15 | 1 |
|   | 0.102 | 15 | 1 |
|   | 0.108 | 30 | 11 |
|   | 0.098 | 30 | 9 |
| G | 0.120 | 12 | 42 |
|   | 0.122 | 12 | 38 |
|   | 0.125 | 12 | 45 |
| H | 0.058 | 12 | 5 |
|   | 0.058 | 12 | 1 |
|   | 0.060 | 12 | 7 |
|   | 0.058 | 12 | 6 |
|   | 0.060 | 12 | 6 |
|   | 0.058 | 15 | 11 |
| I | 0.120 | 12 | 0 |
|   | 0.128 | 12 | 0 |
|   | 0.130 | 12 | 0 |
|   | 0.120 | 15 | 5 |
|   | 0.128 | 15 | 0 |
|   | 0.130 | 15 | 1 |
|   | 0.120 | 30 | 48 |

¹ Kept burning.

Silicone elastomers from compositions of (B) through (I) above having tin catalyst added burn as did silicone elastomers from composition (A) above.

That which is claimed is:

1. A room temperature vulcanizable silicone elastomer composition which is stable in the absence of moisture but cures upon exposure to moisture consisting essentially of a composition prepared by mixing under essentially anhydrous conditions (A) 100 parts by weight of a hydroxyl endblocked polydimethylsiloxane having a viscosity of from 1000 to 300,000 cs. at 25° C., (B) from 5 to 150 parts by weight of a filler selected from the group consisting of silica and titanium dioxide, (C) from 5 to 20 parts by weight of a silane of the formula RSiY₃ where R is a vinyl radical and Y is a radical selected from the group consisting of an acetoxy radical and a ketoxime radical of the formula —O—N=CR'R" where each R' and R" is a radical selected from the group consisting of methyl and ethyl, (D) from 0.5 to 4 parts by weight carbon black having a surface area of at least 10 square meters per gram and a particle size of from 0.005 to 0.20 micron, and (E) from 1 to 150 parts by weight platinum per million parts by weight of composition, the platinum being in the form of a platinum compound, said composition being free of sulfur, compounds of tin, mercury, bismuth, copper and sulfur whereby the composition when cured by exposure to moisture provides a silicone elastomer which has a self-extinguishing time of less than 20 seconds after 12 second exposure in a 1550° C. flame on a sample having a thickness of less than 0.100 inch.

2. The room temperature vulcanizable silicone elastomer composition according to claim 1 in which there is also present a metal oxide selected from the group consisting of zinc oxide, iron oxide and aluminum oxide in an amount of from 0.1 to 10 parts by weight.

3. The room temperature vulcanizable silicone elastomer composition according to claim 1 in which the filler is silica.

4. The room temperature vulcanizable silicone elastomer composition according to claim 3 in which the silica is a fume silica filler.

5. The room temperature vulcanizable silicone elastomer composition according to claim 3 in which the silica filler is a mixture of fume silica filler and finely divided quartz.

6. The room temperature vulcanizable silicone elastomer composition according to claim 1 in which each Y is an acetoxy radical.

7. The room temperature vulcanizable silicone elastomer composition according to claim 2 in which each Y is an acetoxy radical.

8. The room temperature vulcanizable silicone elastomer composition according to claim 3 in which each Y is an acetoxy radical.

9. The room temperature vulcanizable silicone elastomer composition according to claim 4 in which each Y is an acetoxy radical.

10. The room temperature vulcanizable silicone elastomer composition according to claim 5 in which each Y is an acetoxy radical.

11. The room temperature vulcanizable silicone elastomer composition according to claim 1 in which each Y is a ketoxime radical.

12. The room temperature vulcanizable silicone elastomer composition according to claim 2 in which each Y is a ketoxime radical.

13. The room temperature vulcanizable silicone elastomer composition according to claim 3 in which each Y is a ketoxime radical.

14. The room temperature vulcanizable silicone elastomer composition according to claim 4 in which each Y is a ketoxime radical.

15. The room temperature vulcanizable silicone elastomer composition according to claim 5 in which each Y is a ketoxime radical.

16. The room temperature vulcanizable silicone elastomer composition according to claim 1 in which the elastomer composition according to claim 1 in which the hydroxyl endblocked polydimethylsiloxane, (A), has a viscosity of from 2,000 to 50,000 cs. at 25° C. inclusive, the amount of filler (B) is from 25 to 100 parts by weight and the amount of carbon black (D) is from 0.5 to 2 parts by weight.

17. The silicone elastomer obtained by exposing the composition of claim 1 to moisture.

18. A method of preparing silicone elastomer consisting essentially of (I) combining under essentially anhydrous conditions (A) 100 parts by weight of a hydroxyl endblocked polydimethylsiloxane having a viscosity of from 1000 to 300,000 cs. at 25° C. (B) from 5 to 150 parts by weight of a filler selected from the group consisting of silica and titanium dioxide (C) from 5 to 20 parts by weight of a silane of the formula $RSiY_3$ where R is a vinyl radical and Y is a radical selected from the group consisting of an acetoxy radical and a ketoxime radical of the formula $-O-N=CR'R''$ where each R' and R'' is a radical selected from the group consisting of methyl and ethyl, (D) from 0.5 to 4 parts by weight carbon black having a surface area of at least 10 square meters per gram and a particle size of from 0.005 to 0.20 micron, and (E) from 1 to 150 parts by weight platinum per million parts by weight of composition, the platinum being in the form of a platinum compound, said composition being free of sulfur, compounds of tin, mercury, bismuth, copper and sulfur, forming a homogeneous mixture, thereafter (II) exposing said homogeneous mixture to moisture until a silicone elastomer is obtained where said silicone elastomer in the form of a test piece having a thickness of less than 0.100 inch is exposed to a 1550° C. flame for 12 seconds has a self-extinguishing time or less than 20 seconds, whereby said silicone elastomer is a flame resistant silicone elastomer.

References Cited
UNITED STATES PATENTS

| | | | |
|---|---|---|---|
| 3,474,064 | 10/1969 | Hittmair et al. | 260—37 SB |
| 3,296,161 | 1/1967 | Kulpa | 260—37 SB X |
| 3,277,047 | 10/1966 | Selin | 260—37 SB X |
| 3,514,424 | 5/1970 | Noble et al. | 260—37 SB |
| 3,652,488 | 3/1972 | Harder | 260—37 SB |

LEWIS T. JACOBS, Primary Examiner

U.S. Cl. X.R.

260—45.75 R, DIG. 24